United States Patent
Cole et al.

(10) Patent No.: US 9,206,979 B2
(45) Date of Patent: Dec. 8, 2015

(54) OXY-FUEL BURNER ARRANGEMENT

(75) Inventors: Jeffrey D. Cole, Nazareth, PA (US); Leighta Maureen Johnson, Orefield, PA (US); Louis Walter Monroig, Whitehall, PA (US); Aleksandar Georgi Slavejkov, Allentown, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 735 days.

(21) Appl. No.: 13/416,340

(22) Filed: Mar. 9, 2012

(65) Prior Publication Data
US 2013/0071796 A1  Mar. 21, 2013

Related U.S. Application Data

(60) Provisional application No. 61/451,250, filed on Mar. 10, 2011.

(51) Int. Cl.
| | |
|---|---|
| F23C 5/00 | (2006.01) |
| F23D 14/58 | (2006.01) |
| F23C 5/28 | (2006.01) |
| F23D 14/22 | (2006.01) |
| F23D 14/84 | (2006.01) |
| F23M 5/02 | (2006.01) |

(Continued)

(52) U.S. Cl.
CPC .............. *F23D 14/58* (2013.01); *C03B 7/065* (2013.01); *F23C 5/14* (2013.01); *F23C 5/28* (2013.01); *F23D 14/22* (2013.01); *F23D 14/32* (2013.01); *F23D 14/84* (2013.01); *F23M 5/025* (2013.01); *F23C 3/00* (2013.01)

(58) Field of Classification Search
CPC ................... F23C 3/00; F23D 14/22

USPC ........................................ 431/8, 187
See application file for complete search history.

(56) References Cited

U.S. PATENT DOCUMENTS 3,758,263 A * 9/1973 Kissel ........................ 431/158
5,256,058 A   10/1993 Slavejkov et al.
(Continued)

FOREIGN PATENT DOCUMENTS

WO    2010144286 A1    12/2010
WO    2011/154285 A1   12/2011

OTHER PUBLICATIONS

Zaman; "Axis Switching and Spreading of an Asymmetric Jet: the Role of Coherent Structure Dynamics"; J. Fluid Mech.; 1996; vol. 316; pp. 1-27.

(Continued)

*Primary Examiner* — Kenneth Rinehart
*Assistant Examiner* — Gajanan M Prabhu
(74) *Attorney, Agent, or Firm* — Michael K. Boyer; Larry S. Zelson (57) ABSTRACT

An oxy-fuel burner arrangement having a first conduit having a nozzle aperture with an aspect ratio, D1/D2, of greater than or equal to about 2.0. The first conduit is arranged and disposed to provide a first fluid stream, where the first fluid stream is a combustible fuel. The burner arrangement further includes at least one second conduit arranged and disposed to provide a second gas stream circumferentially around the first fluid stream, where the second gas stream includes oxygen. A precombustor is arranged and disposed to receive the first fluid stream and second gas stream where an oxy-fuel flame is produced. The geometry of the nozzle aperture and the cross-sectional geometry of the first conduit are dissimilar.

6 Claims, 7 Drawing Sheets

(51) Int. Cl.
  *C03B 7/06* (2006.01)
  *F23C 5/14* (2006.01)
  *F23D 14/32* (2006.01)
  *F23C 3/00* (2006.01)

(56) References Cited

U.S. PATENT DOCUMENTS

| | | | |
|---|---|---|---|
| 5,500,030 A * | 3/1996 | Joshi et al. | 65/346 |
| 5,545,031 A * | 8/1996 | Joshi et al. | 431/8 |
| 5,547,368 A * | 8/1996 | Slavejkov et al. | 431/8 |
| 5,575,637 A * | 11/1996 | Slavejkov et al. | 431/8 |
| 5,620,316 A * | 4/1997 | Duboudin et al. | 431/181 |
| 6,866,503 B2 * | 3/2005 | Ladharam | 431/10 |
| 7,500,849 B2 * | 3/2009 | Dudill et al. | 431/8 |
| 2003/0015604 A1 | 1/2003 | Kobayashi et al. | |
| 2003/0054301 A1 | 3/2003 | Borders et al. | |
| 2006/0260320 A1 | 11/2006 | Bertolotti et al. | |
| 2010/0077944 A1 | 4/2010 | Slavejkov et al. | |
| 2010/0310996 A1 * | 12/2010 | Kalcevic et al. | 431/2 |
| 2011/0000261 A1 | 1/2011 | Prabhakar et al. | |

OTHER PUBLICATIONS

Gollahalli, S.R., et al.; "Diffusion Flames of Gas Jets Issued from Circular and Elliptic Nozzles"; Combust. Sci. And Tech.; vol. 86; 1992; pp. 267-288.

Gutmark, E.J.; "Flow Control with Noncircular Jets"; Annu. Rev. Fluid Mech.; 1999; vol. 31; pp. 239-272.

Kirilenko, V. I., Flat-Flame Combustion of Natural Gas in a Recuperative Glass-Melting Furnace, Plenum Publishing Corporation, Mar. 15, 1988, XP055137265, Retrieved from the Internet: URL:http://download.springer.com/static/pdf/559/art. 8: "8 Heat Transfer from Burners", Dec. 31, 2000, XP055173607, Retrieved from the Internet: URL: ftp://ftp.demec.ufmg.br/ema867j/Livros_selecionados/Combustaolnd/1699___08.pdf, [retrieved on Mar. 4, 2015].

* cited by examiner

OXY-FUEL BURNER ARRANGEMENT

This Application claims the benefit of U.S. Provisional Application No. 61/451,250, filed on Mar. 10, 2011. The disclosure of the Provisional Application is hereby incorporated by reference in its entirety.

BACKGROUND OF THE INVENTION

The instant invention relates to burners and methods for using the burners for industrial heating including oxy-fuel burners employed in the transport channels leaving a glass melting furnace and those employed in small specialty glass melters.

Air-fuel glass conditioning burners, such as the burners used in refining or in the forehearth, do not use preheated air. Much of the energy supplied to the conditioning operation from the air-fuel burners is used to heat the nitrogen in the air. Efficiency improvement achievable by switching from air-fuel to oxy-fuel burners is at least 60%. Typical oxy-fuel glass conditioning burners are designed with high fuel velocities for rapid mixing of fuel and oxygen at the oxygen and fuel gas outlets. These burners generate flames that diverge widely as the distance from the nozzle increases. The burner block opening required to accommodate these flames must be divergent as well, providing the opportunity for volatile material to make its way into the block channel and deposit on the nozzle tips. Small nozzle tip openings are easily clogged from these deposits, causing glass contamination with molten metal from the damaged burner and unfavorable glass temperature distributions in the conditioning area that lead to glass quality issues. This nozzle clogging problem is not easy to identify before glass quality issues arise, since there is often a lack of a clear view of the flames in the glass conditioning and forehearth areas. Furthermore, partial clogging of the nozzle can misdirect the oxy-fuel flame and lead to burner block damage or direct flame impingement on the glass surface, causing glass contamination or volatilization of the high boiling components of the glass.

In the case of the distribution canals (e.g., within the forehearth) which transport the molten substance from the melting furnace to the installations downstream, such as shaping machines in particular, the burner or burners supply the energy necessary such that on entering the downstream (shaping) installation, the molten substance has homogeneous properties such as temperature, viscosity, among other properties, that are suited to its treatment in the downstream installation. The distribution canal may in particular be equipped with burners aimed at compensating for heat losses through the walls of the canals so as to reduce the heterogeneity, notably in terms of the temperature of the molten substance in the transverse section of the distribution canals. The burners of the distribution canals are then, as a general rule, low power burners the flame of which is limited to a zone near the walls of the canal.

When employing a flame in a distribution canal which extends beyond the zone near the walls of the canal and which therefore also heats the molten material in the central zone of the canal, there is substantial risk of reboiling the molten material in this zone and, therefore, of having an end product that exhibits inhomogeneities and corresponding defects.

The width of the molten material distribution channels may be small creating a challenge in maintaining a homogeneous temperature distribution while firing the burners at a firing rate sufficient to maintain the optimal glass temperature. For example, fiberglass forehearths are very narrow, often less than 18 inches wide which can present a challenge of supplying sufficient thermal energy to the system without flame impingement on the opposite wall.

Other applications for burners in glass melting operations may utilize medium to high firing rates and include specialty glass furnaces, such as pot furnaces and day tanks, or large capacity molten material distribution channels, canals and refiners. These applications require relatively high heat input per volume of furnace. This requires relatively high firing rate burners to provide sufficient heat input. At the same time, the distance between the furnace walls is relatively small. Air-fuel fired installations such as these achieve the required heat input within the confined space by firing the air-fuel burners in an arrangement where the air-fuel burner mounted on the opposite wall is directly opposed to the air-fuel burner mounted on the near wall. The high momentum of one of the opposed air-fuel flames effectively balances the high momentum of the other opposed air-fuel flame, protecting the opposite wall from overheating. This opposed air-fuel burner configuration creates a lot of turbulence in the combustion chamber which can create hot spots. Hot spots in the combustion chamber can also be generated if the flows to the opposed air-fuel burners are not well balanced or the burners are poorly aligned when installed. Even when this opposed installation method is employed, air-fuel burners are often unable to provide the desired amount of energy to the chamber, limiting glass temperature, compromising product quality and reducing production rates. Homogeneous glass temperature throughout the chamber is important to maintain product quality for these applications. It is desirable to have a means for providing the necessary thermal energy without generating hot spots on the refractory or within the molten material.

Burner design involves a variety of factors to consider, including fluid flow, mixing of gases and other considerations, particularly with respect to burner nozzles. Altering flow from nozzles having different aperture geometries to affect gas mixing has been studied. For example, a 1999 article by Gutmark, E. J. et al., entitled "Flow Control with Noncircular Jets" reports a trend for entrainment with different nozzle aperture geometries with air at room temperature. This data shows that the circle nozzle imparts the lowest amount of entrainment and the slot and zipper nozzle geometries promote higher entrainment. Higher entrainment for the nozzle aperture shape means more mixing between fuel and oxygen streams for a burner configured with fuel gas nozzle with the high entrainment design and an oxidant stream surrounding the fuel stream. Gollahalli, S. R. et al. (Combustion Sci. Technol. 1992, 86:1-6, 267 "Diffusion Flames of Gas Jets Issued from Circular and Elliptic Nozzles"), studied diffusion flames from circle and elliptical (aspect ratio major axis/minor axis 3:1) fuel nozzle apertures using nitrogen diluted propane fuel (Re 4740 for circle nozzle) and a low velocity concentric air stream. Gollahalli confirmed that Gutmark's results with the cold flow tests can be translated to air fuel propane flames. Gollahalli found enhanced mixing between fuel and air in flames produced from an elliptical fuel nozzle aperture compared with flames produced from a circle fuel nozzle aperture having the same open area. Gollahalli's tests were limited to the open air firing of air fuel flames from burners without precombustors. Gollahalli did not report any difference in the length of the flame produced from the two different nozzle geometries. In fact, the carbon monoxide concentration (a measure sometimes used to estimate flame length) measured at the mid range and furthest distance from the nozzle tip was characterized by the authors as 'not significantly different' for the two different nozzle geometries.

Another paper by Zaman, K. B. M. Q. Zaman, entitled "Axis Switching and Spreading of an Asymmetric Jet: The Role of Coherent Structure Dynamics", discusses how flow develops with asymmetrical nozzles, mapping mean velocity contour slices as a function of distance from the nozzle. Zaman found that the spreading of the flows is enhanced for asymmetrical nozzles that have vortex generators. These vortex generators are essentially tabs machined on the walls of the slot that create a discontinuity along the wall. The authors also introduce the concept of axis inversion, where the flow can start spreading along the long axis of the slot and switch direction 180 degrees at some distance from the nozzle tip. The experiment where air flows through a slot nozzle shows that the flows spread in the direction of the asymmetry until at some distance from the nozzle the flow returns to a circular shape. The impact of the vortex generator is to disrupt the typical flow pattern developed by the smooth-walled nozzle aperture, leading to axis inversion (for delta tabs mounted on the short edge of the slot) or preventing the flows from reverting to a circular pattern, (stabilizing the spreading of the flows at larger distances from the nozzle). The articles from Zaman and Gutmark show flow behavior resisting the formation of the flat flame, where flat flow patterns either require complicated burner arrangements or only have flat flow patterns for a portion of the flow from the burner face. A nozzle with a slot shape but lacking a smooth edge (zipper) enhances mixing so much that the precombustor begins to overheat if the precombustor has a similar L/D as the precombustor used for the slot with the smooth surface.

Known combustion methods are described in U.S. Pat. No. 5,256,058; US Pub No. 2010/0310996; and U.S. Pat. No. 5,500,030; the disclosure of which is hereby incorporated by reference. The principle of the oxy-fuel burner disclosed in '058 is to delay mixing of the fuel and oxygen while confining the near nozzle portion of the oxy-fuel flame inside a precombustor to produce a highly luminous flame. This flame provides very efficient heat transfer in large furnaces and inhibits buildup and corrosion on the burner nozzles. One drawback of the delayed mixing approach is that the flames are too long to supply the needed energy to channels, canals and forehearths without overheating the glass in the center of a wide forehearth or overheating the refractory on the opposite wall of a narrow forehearth, canal or small specialty glass melting furnace. Another drawback is that the '058 flames do not are not capable of maintaining sufficient temperature homogeneity of the glass inside these glass conditioning structures, adversely affecting product quality.

One attempt at obtaining a flat flame is disclosed in Kobayashi, U.S. Patent Publication No. US2003/0015604, which is incorporated by reference in its entirety. Kobayashi discloses introducing a gas stream above and below the fuel gas stream to 'flatten' the flame. Kobayashi utilizes a complicated design and does not utilize fluid dynamics from the nozzle shape and burner operation to alter the flame geometry.

A forehearth burner is disclosed by International Publication No. WO2011/154285, which is incorporated by reference in its entirety. In the WO2011/154285 Publication, an oxy-fuel burner is disclosed for use with a forehearth of a glass melting furnace. However, the design disclosed has limited ability to alter the flame geometry and provide uniformity in heating.

An oxy-fuel burner arrangement, a combustion system, and method for enriching combustion of a combustible fuel with oxygen that is efficient and reduces or eliminates overheating of the burner components reduces or eliminates overheating of the refractory on the opposite wall of the furnace, while providing thermal energy in a manner that maintains a homogeneous temperature throughout the transport channel of molten material would be desirable in the art.

BRIEF SUMMARY OF THE INVENTION

The instant invention relates to an oxy-fuel burner having a fuel conduit that is surrounded by an oxygen conduit. The burner is disposed within a precombustor such that the mixing between the fuel and oxygen gas producing a confined and shielded diffusion flame is increased to generate a shortened oxy-fuel flame without overheating of burner components. The instant invention also relates to a method for using the inventive burner arrangement for use in transport channels for molten material.

One aspect of the present disclosure includes an oxy-fuel burner arrangement. The oxy-fuel burner arrangement includes a first conduit having a nozzle aperture with an aspect ratio, $D_1/D_2$, of greater than or equal to about 2.0. The first conduit is arranged and disposed to provide a first fluid stream, where the first fluid stream is a combustible fuel. The burner arrangement further includes at least one second conduit arranged and disposed to provide a second gas stream circumferentially around the first fluid stream, where the second gas stream includes oxygen. A precombustor is arranged and disposed to receive the first fluid stream and second gas stream where an oxy-fuel flame is produced. A cross section of the precombustor opening along its length is circular in shape. The geometry of the nozzle aperture and the cross-sectional geometry of the first conduit are dissimilar. The geometry of the first conduit nozzle aperture enhances entrainment of the second gas, producing a shortened flame without overheating of burner components.

Another aspect of the present disclosure includes an oxy-fuel burner arrangement comprising a first conduit having a nozzle aperture with an aspect ratio, $D_1/D_2$, of greater than or equal to about 2.0 and/or a nozzle aperture with at least one or a plurality of vortex generators. The first conduit is arranged and disposed to provide a first fluid stream, where the first fluid stream is a combustible fuel. The burner arrangement further includes at least one second conduit arranged and disposed to provide a second gas stream circumferentially around the first fluid stream, where the second gas stream includes oxygen. A precombustor is arranged and disposed to receive the first fluid stream and second gas stream where an oxy-fuel flame is produced. A cross section of at least the outlet of the precombustor is asymmetric in shape where the long axis is aligned with the spreading direction of the flows from the nozzle. The geometry of the nozzle aperture and the cross-sectional geometry of the first conduit are dissimilar. The shape of the aperture of the first conduit nozzle enhances and stabilizes the spreading of the gas flows as they exit the nozzle, producing a flat flame.

Another aspect of the present disclosure includes an oxy-fuel combustion system having at least one oxy-fuel burner arrangement. The oxy-fuel burner arrangement includes a first conduit having a nozzle aperture with an aspect ratio, $D_1/D_2$, of greater than or equal to about 2.0 and/or a nozzle aperture with at least one or a plurality of vortex generators. The first conduit is arranged and disposed to provide a first fluid stream, where the first fluid stream is a combustible fuel. The burner arrangement further includes at least one second conduit arranged and disposed to provide a second gas stream circumferentially around the first fluid stream, where the second gas stream includes oxygen. A precombustor is arranged and disposed to receive the first fluid stream and second gas stream where an oxy-fuel flame is produced. The geometry of the nozzle aperture and the cross-sectional geometry of the first conduit are dissimilar. The oxy-fuel combustion system further includes a combustion zone including an enclosed space, the enclosed space arranged and disposed to receive a material to be heated or conditioned.

Another aspect of the present disclosure includes a method for producing a flat oxy-fuel flame. The method includes providing an oxy-fuel burner arrangement a first conduit, at least one second conduit and a precombustor. The method also includes providing a first fluid stream with the first conduit having a nozzle aperture with an aspect ratio, $D_1/D_2$, of greater than or equal to about 2.0, and/or a nozzle aperture with at least one or a plurality of vortex generators, where the first fluid stream is a combustible fuel. Also provided is at least one second conduit arranged and disposed to provide a second gas stream circumferentially around the first fluid stream, where the second gas stream includes oxygen. A precombustor is provided with at least a cross section at the outlet that is asymmetric in shape where the long axis is aligned with the spreading direction of the flows from the nozzle. An oxy-fuel flame is formed with the first and second gas streams. The geometry of the nozzle aperture and the cross-sectional geometry of the first conduit are dissimilar.

Other features and advantages of the present invention will be apparent from the following more detailed description of the preferred embodiment, which illustrates, by way of example, the principles of the invention. The features of the present invention can be used alone or in combination with each other.

BRIEF DESCRIPTION OF SEVERAL VIEWS OF THE DRAWINGS

The Drawings are provided to illustrate certain aspects of the invention and are not drawn to scale.

Wherever possible, the same reference numbers will be used throughout the drawings to represent the same part.

DETAILED DESCRIPTION OF THE INVENTION

The present disclosure now will be described more fully hereinafter with reference to the accompanying drawings, in which a preferred embodiment of the disclosure is shown. This disclosure may; however, be embodied in many different forms and should not be construed as limited to the embodiments set forth herein; rather, these embodiments are provided so that this disclosure will be thorough and complete and will fully convey the scope of the disclosure to those skilled in the art.

As utilized herein, the term "oxygen" and grammatical variations thereof refers to an oxidizing gas having an $O_2$ concentration greater than that of atmospheric or ambient conditions including oxygen enriched air and commercially available oxygen.

As used herein, the term "oxy-fuel combustion", "oxy-fuel" and grammatical variations thereof refers to combustion of fuel in oxygen. Although various embodiments illustrate flames in particular locations, it will be appreciated that the location of the flames may vary from the illustrations.

As utilized herein, a "low firing rate" includes a firing range of from about 4,000 Btu/h to about 15,000 Btu/h. A "medium firing rate" includes a firing range of from about 12,000 Btu/h to about 250,000 Btu/h. A "high firing rate" includes a firing range of from about 0.5 MMBtu/h to about 2.0 MMBtu/h.

As utilized herein, a "short" or "shortened" flame means a visible flame length that extends within a combustion zone of a furnace and covers less than one-hundred percent of the combustion zone. Depending upon the material being heated in the furnace and the firing rate of the burner and the size of the furnace, the flame can extend from about 25 to about 75 percent of the combustion zone.

As utilized herein, "flat flame geometry", "flat flame", "flat geometry", and grammatical variations thereof are intended to mean a flame having a geometry with a cross-section that is elongated in one dimension compared to a perpendicular dimension. The flat flame geometry preferably includes a flat geometry throughout the length of the flame.

As utilized herein, a "vortex generator" includes corrugated, lobed, or indented nozzle aperture edges that promote controlled vortex generation.

The terms "burner arrangement" and "burner" are equivalent and define an apparatus of assembled parts for the combustion of a mixture of fuel with oxygen. The term "precombustor" is defined as a space that receives gas streams for combustion at the inlet and allows these gases and products of oxy-fuel combustion to enter the combustion zone through the outlet. The precombustor may be formed or retro-fitted for example, by a burner block, a burner block adapter, an assemblage of pieces, or a combination thereof. The term "combustion zone" is defined as a space such as a furnace, downstream from the precombustor, in which combustion reactions occur, at least one of which may be the reaction of a carbon and/or hydrogen-containing fuel with oxygen to form carbon oxides and/or water and heat.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

The present invention relates broadly to oxy-fuel burners and oxy-fuel combustion. Since oxy-fuel burners produce flames with higher temperature than the flames produced by air-fuel burners, oxy-fuel burners can supply more heat to the combustion chamber than air-fuel burners at the same firing rate. The oxy-fuel burners are 60% more efficient than air-fuel burners and can deliver equivalent heat input as the air-fuel burners at a substantially lower firing rate. The lower firing rate for oxy-fuel burners allows the installation of the burners in a staggered configuration within the material melting furnace, such as a glass-melting furnace (see for example, FIG. 14), where the center line of the oxy-fuel burner on the opposite wall of the chamber is mounted equi-distant between the center line of the two burners on the near wall of the chamber. The maximum firing rate of the burner in the chamber is determined by the length of the oxy-fuel flame, since the flame begins to impinge on the opposite wall at some point. The burner arrangement according to the present disclosure is advantageous in that the oxy-fuel burner is capable of operating at higher firing rates in furnaces with relatively narrow wall spacing or in distribution channels where flames must remain close to channel walls than a similarly configured prior art oxy-fuel burner with a circular fuel nozzle aperture geometry. The system of the current disclosure has the further advantage of producing a more homogeneous temperature distribution in the chamber than a known oxy-fuel burner arrangement.

The present invention also relates an oxy-fuel burner arrangement, an oxy-fuel combustion system and method for producing a shortened and/or flat oxy-fuel flame. In particular, the instant invention relates to an oxy-fuel burner having a fuel conduit that is surrounded by an oxygen conduit that forms a shortened and/or flat flame. In one embodiment, the geometry of the fuel conduit aperture or nozzle is varied to produce a flame having a predetermined configuration, including a flat flame.

Figure 1:
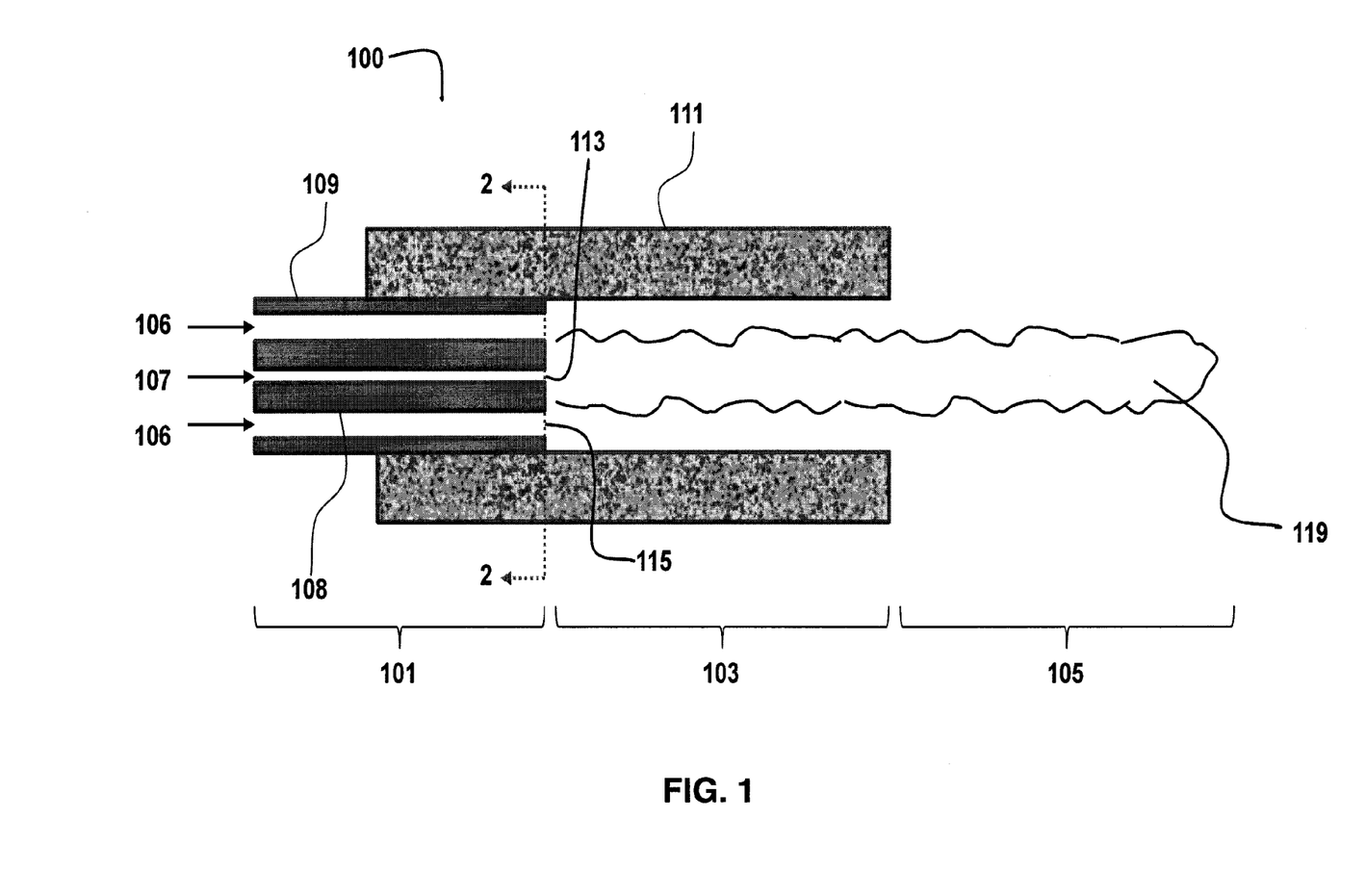
FIG. 1 is a schematic drawing of an oxy-fuel burner arrangement according to an embodiment of the present disclosure.

In one aspect of the invention, the oxy-fuel flame is produced using a nozzle aperture (e.g., 201 in FIG. 7) that achieves the effect of a luminous flame and can reduce or eliminate entrainment of harmful furnace contaminants into the first and second conduits, burner block 111 or precombustor 103 (e.g., as shown in FIG. 1). The burner arrangement according to the present invention can provide a suitably shortened and/or flat flame to make the burner operable at relatively high firing rates within narrow canals of a furnace. The short flame can be produced by making the geometry of the fuel nozzle aperture non-circular in shape. Further, the non-circular fuel nozzle aperture shape can have an aspect ratio ($D_1/D_2$) of greater than or equal to about 2.0, and typically, at least 3.0 in order to exhibit the desired flame characteristics (see for example FIG. 7). The high aspect ratio fuel nozzle aperture coupled with the cylindrical cross section precombustor (see FIGS. 2 and 3) produces a short flame. The nozzle apertures with high aspect ratios and/or vortex generators such as delta tabs (see FIGS. 7, 11-13) are useful for producing short and/or flat flames. The high aspect ratio fuel nozzle aperture with optional delta tabs coupled with a precombustor having an outlet with an asymmetric cross section (FIGS. 4-5) produces flat flames. The nozzle aperture of the first conduit may provide a geometry having elongated, asymmetrical or controlled vortex generating features.

In another aspect of the invention, an advantage of the non-circular fuel nozzle aperture geometry is that the precombustor temperature can be reduced compared with the precombustor temperature using a circle or symmetric fuel nozzle (at the same firing rate). A lower precombustor temperature increases refractory life and the ability of the non-circular nozzle aperture to be operated at lower firing rates than the non-circular burner thereby making the non-circular nozzle aperture burner design more flexible. Table 3 (below) lists examples showing the difference between the temperature of the precombustor for burners firing the circular and non-circular nozzle apertures at different distances from the hot face of the burner. The precombustor temperature for the burner firing with the non-circular nozzle aperture is typically lower than the temperature of the burner firing with the symmetric nozzle aperture. The temperature difference is the greatest closer to the burner tip (i.e., the region that is most insulated from the influence of the hot face).

Contrary to the high velocity cold flow tests known in the art by, for example, Zaman and Gutmark et al., the flames generated with the burner arrangement 100 according to the present disclosure result in axis inversion and a flat flame. For example, in contrast to the disclosure in the Zaman article showing that the spreading of the flow should correspond to the direction of the long side of the slot, the present inventive burner arrangement 100 demonstrates axis inversion and a flat flame. The burner arrangement 100, according to the present disclosure, has a flat flame with the longer dimension corresponding to the short side (i.e., $D_2$ in FIG. 7). While not wishing to be bound by theory or explanation, it is believed that the flat flame geometry observed for burners equipped with fuel nozzles having non-circular apertures, according to the present disclosure, is due to the ability of the aperture geometry to alter the gases mixing inside the precombustor. Nozzle apertures 201 with aspect ratios, $D_1/D_2$, less than 2.0 do not have enough of an effect on the gas mixing to change the observed flame characteristics compared with a circular fuel nozzle aperture. Apertures with aspect ratios ($D_1/D_2$) in nozzle aperture 201 greater than 2.0 increase gas mixing inside the precombustor, giving rise to a shorter, flat flame. The height or thickness of the visible portion of the flame observed from the horizontally mounted slot is larger than the height of the visible portion of the flame observed from the vertically mounted slot when produced with a cylindrical precombustor. This flame height differential was observed horizontally by firing two burners side by side at the same firing rate with one slot fuel aperture mounted in the horizontal orientation and one slot fuel aperture mounted in the vertical position, the height of the luminous section of the flame is larger for the horizontal slot orientation than the vertical slot orientation, perpendicular to the long axis of the slot. It is also believed that axis inversion and the resultant flat flame results in the lower block temperatures measured inside the precombustor for the slot nozzle aperture.

In one aspect of the invention, the burner is employed in the forehearth of a glass-melting furnace at a low firing rate. In such an aspect, it is desirable for the burner to have a short flame. The flame length and geometry provided by the current invention can provide high luminosity oxy-fuel flames (e.g. as used in fiberglass manufacture), that do not impinge on or overheat the opposite wall of the narrow glass forehearth channels. The short flame length provided by the current invention is also useful for providing flames that concentrate heat near the walls of the forehearth to prevent reboiling of the hotter molten material at the center of larger width channels. The flat flame geometry permits substantially uniform heating over a larger area. In other embodiments, the flat flame geometry permits a reduction of the number of burners in a combustion system.

In other aspects of the invention, the fuel and oxygen conduits can terminate at the same location within the precombustor, or the fuel nozzle can terminate at a location different than the point of termination of the oxygen conduit. In one aspect, the oxygen conduit extends beyond the fuel conduit and forms a portion of the precombustor. In another aspect, the fuel and oxygen conduits can be fitted with an adaptor to facilitate installation into an air fuel burner block for a retrofit installation. In other aspects of the invention, the burner arrangement provides a lower precombustor temperature which reduces or eliminates damage to the burner block.

Referring now to the Figures, FIG. 1 shows a schematic illustration of a oxy-fuel burner arrangement 100. The oxy-fuel burner arrangement 100 includes burner nozzle section 101, a precombustor 103 and a combustion zone 105. The burner nozzle section 101 includes burner inlet portions 106 and 107, including a first conduit 108 and a second conduit 109 circumferentially disposed around the first conduit 108. The second conduit 109 may be a single continuous conduit or opening or may be a plurality of conduits, nozzles, or orifices. In the embodiment shown in FIG. 1, the precombustor 103 is defined by burner block 111 and receives a first fluid stream 113 and a second gas stream 115 from the first and second conduits 108, 109. In other embodiments, the precombustor 103 may be formed by a portion of the second conduit 109 and a portion of the burner block 111. Precombustor 103 may have a cylindrical geometry with a constant diameter, or a cylindrical geometry with a constant diameter section coupled to a flared section (e.g., coupled via an inclined or a tapered area). Precombustor 103 is not so limited and may have any suitable geometry for receiving gas streams from burner nozzle section 101. In one embodiment, the precombustor 103 includes a geometry with a cylindrical geometry at the inlet and an asymmetric cross section at the outlet, aligned with the spreading direction of the flows from conduits 108, 109 that receives the corresponding flame geometry (see for example FIGS. 7 and 11-13).

The burner nozzle section 101 provides a first fluid stream 113 and a second gas stream 115 to the precombustor 103. The first fluid stream 113 is a combustible fuel. The combustible fuel is any suitable fuel capable of combustion suitable for heating molten material, such as glass. Suitable combustible fuels include, but are not limited to, gaseous hydrocarbon, such as natural gas, methane or propane, carbon monoxide, hydrogen-containing gas, such as gas having less than 50 vol % hydrogen and combinations thereof. In other embodiments, liquid combustible fuels such as fuel oil, heating oil, waste oil, slurries and the like may also be used. The second gas stream 115 is an oxygen-containing gas having oxygen concentrations ranging from greater than 20.9 vol % (air) to greater than 99.5 vol % (high purity oxygen). The oxygen-containing gas preferably includes greater than or equal to about 50 vol % oxygen or greater than 80 vol % oxygen.

The first fluid stream 113 and the second gas stream 115 are provided in a manner that achieves a two phase turbulent diffusion flame inside the precombustor while keeping the precombustor wall temperature well below the temperature of the oxy-fuel flame. The flow of the first fluid stream 113 and the second gas stream 115 into the precombustor according to the present disclosure may reduces or eliminates overheating of the burner block 111 or other components of the burner arrangement 100. Overheating of components includes exposure to temperatures significantly higher than the temperature of an air-fuel flame. The temperatures that result in overheating are sufficiently high that, for example, exposure to these temperatures could damage or melt the refractory material of the burner block 111 or the other components of the burner arrangement 100. From the precombustor 103, the first fluid stream 113 and the second gas stream 115 are provided to the combustion zone 105. A source of ignition (not shown) is provided to initiate the combustion and form the flame 119. The flame 119 is not limited to the geometry or the position shown and includes combustion of the mixture of the first fluid stream 113 with the oxygen of the second gas stream 115. The flame 119 may initiate in the precombustor 103 and extend into the combustion zone 105.

The precombustor 103 has a geometry that corresponds to the flame geometry formed to minimize or eliminate damage from impingement and/or overheating of the material of the precombustor 103.

Figure 2:
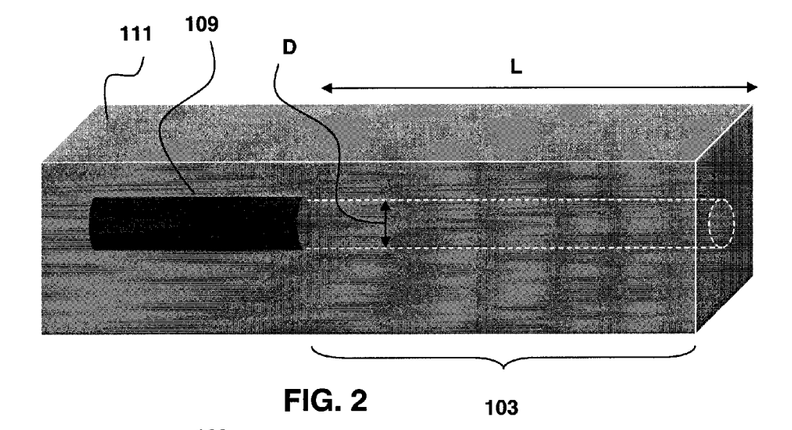
FIG. 2 is a schematic drawing of the burner block defining a precombustor according to an embodiment of the present disclosure with a cylindrical geometry.

Referring now to FIG. 2, FIG. 2 is a schematic drawing of a burner arrangement 100 with burner block 111 coupled with second conduit 109 giving rise to straight cylindrical precombustor 103, according to an embodiment of the present disclosure.

Figure 3:
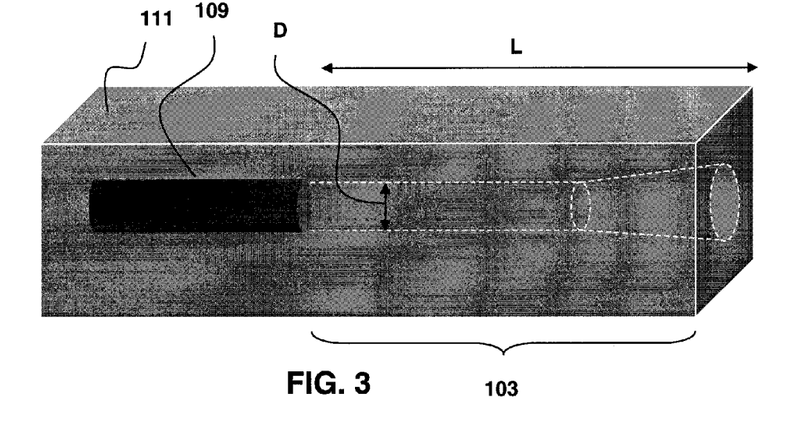
FIG. 3 is a schematic drawing of the burner block defining a precombustor according to another embodiment of the present disclosure with a cylindrical and flared geometry.

Referring now to FIG. 3, FIG. 3 is a schematic drawing of a burner arrangement 100 with burner block 111 coupled with second conduit 109, giving rise to straight followed by flared cylindrical precombustor 103, according to another embodiment of the present disclosure. In addition, the burner arrangement 100 shown in FIGS. 2 and 3 includes a defined precombustor length to diameter ratio, L/D, wherein L is the length of a straight channel (cylindrical) precombustor and D is the diameter of the straight channel precombustor. The precombustor length to diameter ratio, L/D, is preferably greater than or equal to about 2.0 or greater than or equal to about 3.0. In one aspect invention, the L/D is less than about 6 or less than about 5.0.

Figure 4:
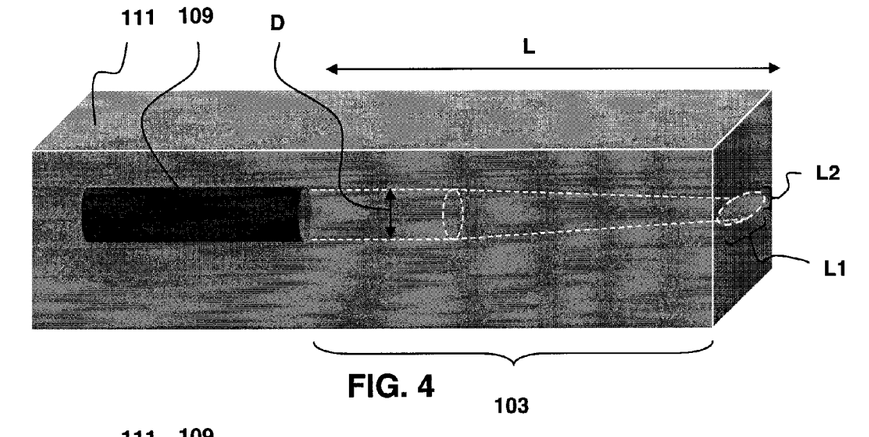
FIG. 4 is a schematic drawing of the side view of a burner block defining a precombustor according to another embodiment of the present disclosure with an asymmetric cross section geometry at the precombustor outlet.
Figure 5:
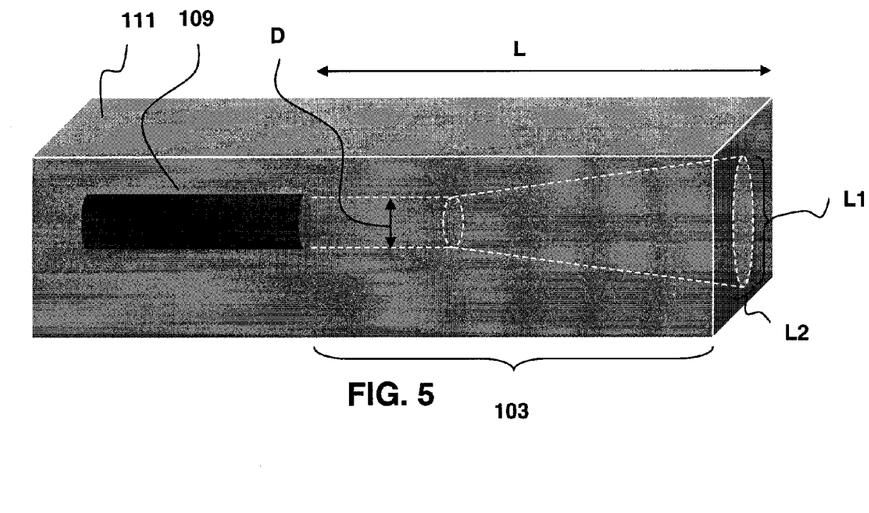
FIG. 5 is a schematic drawing of the top view of a burner block defining a precombustor according to another embodiment of the present disclosure with a asymmetric cross section geometry at the precombustor outlet.

Referring now to FIGS. 4 and 5, FIG. 4 and FIG. 5 are schematic drawings of a side view and top view, respectively, of a burner arrangement 100 with burner block 111 coupled with second conduit 109 giving rise to precombustor 103, according to another embodiment of the present disclosure. Precombustor 103 in this embodiment has an asymmetric cross section geometry at the outlet with L1 being the long side and L2 the short side of the precombustor channel opening. The aspect ratio, L1/L2, of the cross section of the precombustor outlet is preferably greater than or equal to about 2.0 or greater than or equal to about 3.0. The burner arrangement in FIGS. 4 and 5 are arranged to receive a flat flame formed by the burner nozzle section 101. The orientation of the long side of the cross section of the precombustor outlet channel opening is arranged such that the longer dimension L1 is arranged parallel to the flat portion of the flame.

In another aspect of the invention, a retrofit-type burner may be formed using a first and second conduit 108 and 109 with second conduit 109 coupled with burner block 111 giving rise to precombustor 103 such that the second conduit 109 extends for a distance past the first conduit 107. Such extension can be provided, for example, to fit an existing burner block 111. The burner arrangement 100, according to the present disclosure, permits operation of the burner such that the extended portion of the second conduit 109 is not damaged due to the inhibited mixing of the fuel and oxygen.

Figure 6:
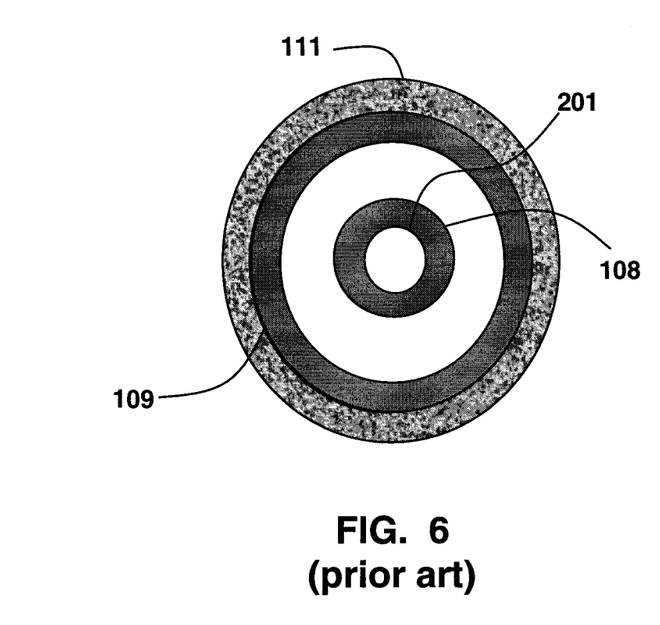
FIG. 6 is a schematic drawing illustrating a known burner arrangement viewed in direction 2-2 of FIG. 1.

Referring now to FIG. 6, FIG. 6 illustrates a configuration of the face of known concentric aperture burner 100 shown in direction 2-2 from FIG. 1. In this embodiment, the face is that of an annular type burner. The first conduit 108, which provides the first fluid stream 113, is surrounded by a continuous second conduit 109 that provides the second gas stream 115 including oxygen. The second conduit is surrounded by a cylindrical section of refractory 111 for positioning the burner. The face of burner arrangement 100 includes a first conduit 108 having nozzle aperture 201 with a circle geometry.

Figure 7:
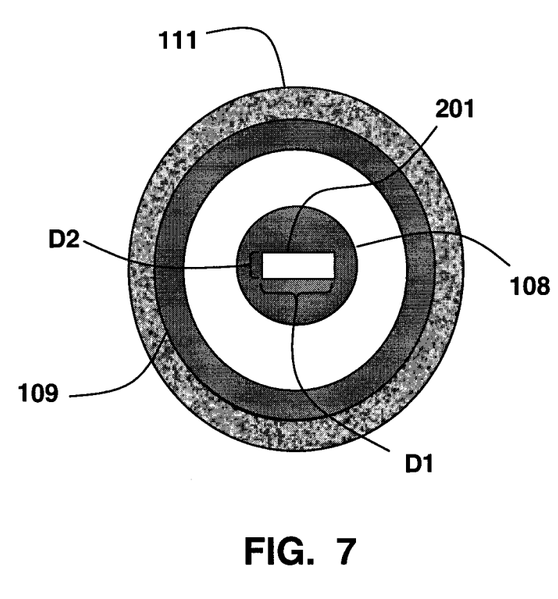
FIG. 7 is a schematic drawing illustrating a burner arrangement according to an embodiment of present disclosure viewed in direction 2-2 of FIG. 1.

Referring now to FIG. 7, FIG. 7 illustrates a configuration of the face of concentric aperture burner 100 shown in direction 2-2 from FIG. 1, according to an embodiment of the present disclosure. In this embodiment, face is that of an annular type burner. The first conduit 108, which provides the first fluid stream 113, is surrounded by a continuous second conduit 109 that provides the second gas stream 115 including oxygen. The second conduit is surrounded by a cylindrical section of refractory 111 for positioning the burner. The face of burner arrangement 100 includes a first conduit 108 having nozzle aperture 201 with a slot geometry. The nozzle aperture geometry 201 and the cross-sectional geometry of the first conduit 108 are dissimilar. In one embodiment, the first conduit 108 has a circle cross-sectional geometry and injects fuel through the nozzle aperture 201 having a slot geometry. In certain embodiments, the geometry of the nozzle aperture 201 includes an aspect ratio, $D_1/D_2$, such that $D_1/D_2 \geq 2.0$ or $D_1/D_2 \geq 3.0$ or $D_1/D_2 \geq 4.0$. The burner arrangement 100 including the nozzle aperture 201 having the aspect ratio of greater than or equal to about 2.0 results in shortened and/or a flat flame.

Figures 8, 9, 10:
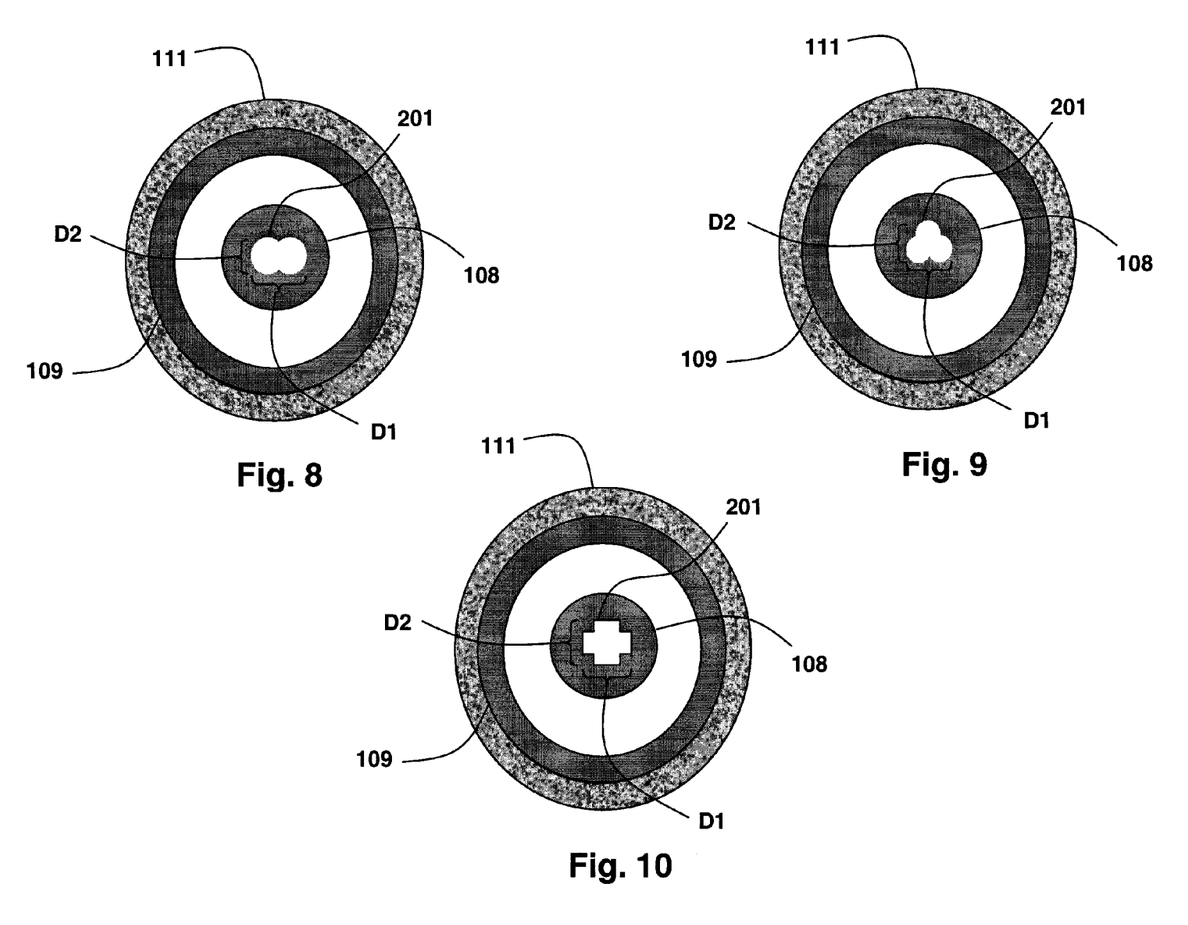
FIGS. 8-10 show schematic drawings showing alternate nozzle aperature geometries not included in the present disclosure viewed in direction 2-2 of FIG. 1.
Figure 11:
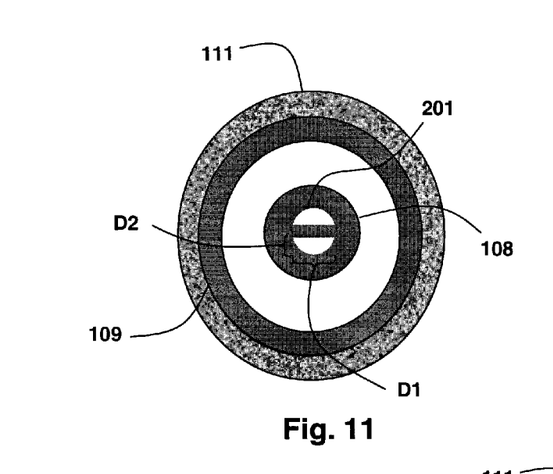
FIGS. 11-13 show schematic drawings showing nozzle aperature geometries according to the present disclosure viewed in direction 2-2 of FIG. 1.
Figure 12:
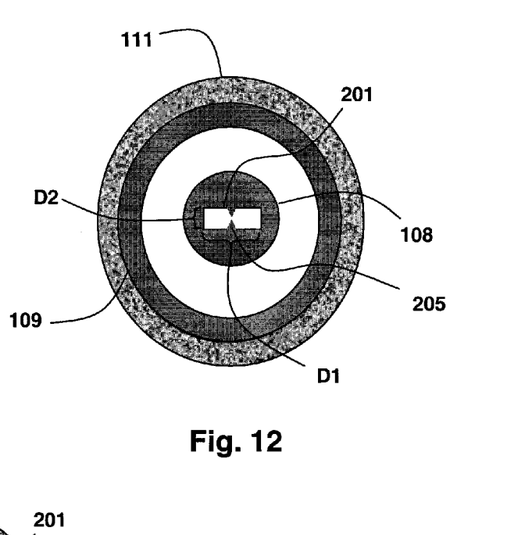
Figure 13:
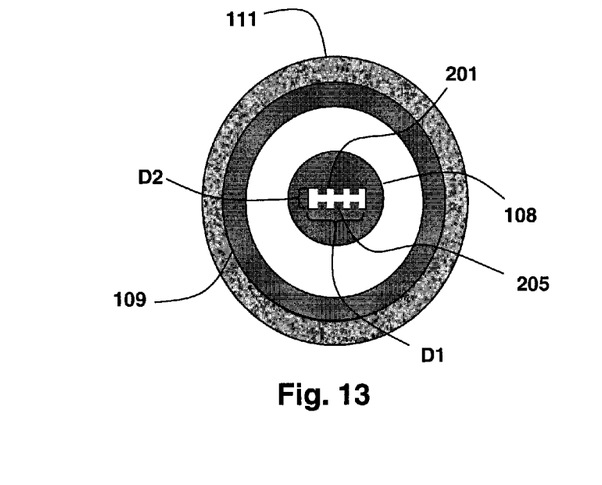

Referring now to FIGS. 8 through 13, FIGS. 8-13 illustrate burner face configurations for burner arrangement 100 substantially as shown and described above with respect to FIGS. 6 and 7. FIG. 8 illustrates the burner face that includes a first conduit 108 having nozzle aperture 201 with a "snowman" geometry. FIG. 9 illustrates the burner face that includes a first conduit 108 having nozzle aperture 201 with a "clover" geometry. FIG. 10 illustrates the face that includes a first conduit 108 having nozzle aperture 201 with a "cross" geometry. As shown in FIGS. 8-10, the snowman geometry, the clover geometry, and the cross geometry have an aspect ratio ($D_1/D_2$) less than 2.0. FIGS. 8-10 show various geometries for nozzle aperture 201 that are not according to this invention, since $D_1/D_2 < 2.0$ and shortened flames are not produced from the burner arrangement with a cylindrical precombustor. FIGS. 11-13 illustrate burner face configurations for burner arrangement 100 substantially as shown and described with respect to FIGS. 6 and 7. FIG. 11 illustrates the burner face that includes a first conduit 108 having nozzle aperture 201 with two half circles. The aperture of FIG. 11 is an aspect of the instant invention, since $D_1/D_2$ of a half circle>2.0 and shortened flames are produced from the burner arrangement with a cylindrical precombustor.

FIGS. 12-13 illustrate the burner face that includes a first conduit 108 having nozzle aperture 201 with $D_1/D_2 > 2.0$ and vortex generators 205 positioned on the long edges. The triangular shaped vortex generators 205 utilized in FIG. 12 are called Delta tabs. The slot shaped nozzle aperture 201 with the vortex generators 205 are designated slot with Delta tabs. FIG. 13 illustrates a nozzle aperture 201 with square shaped vortex generators 205, designated a 'zipper' geometry. Vortex generators are not limited to the aspects of the invention illustrated in FIGS. 12 and 13, and can be used as desired to control or modify the flow of gases exiting a nozzle.

The nozzle aperture geometries illustrated in FIGS. 12-13 are aspects of the instant invention and produce flat flames when coupled with a precombustor having an asymmetric outlet cross section. To form the flat flame according to the present disclosure, the non-circular fuel nozzle aperture geometry has an aspect ratio ($D_1/D_2$) of greater than or equal to about 2.0 and at least one but preferably at least two vortex generators. While the specific geometries of FIGS. 8-10 are shown as having an aspect ratio ($D_1/D_2$) less than 2.0, it is noted that geometries having a similar configuration according to the present disclosure, such as elongated snowmen, or flattened crosses wherein the nozzle aperture 201 has a geometry with an aspect ratio ($D_1/D_2$) of greater than or equal to about 2.0 would be an aspect of the current invention, producing a shortened flame when coupled with a cylindrical precombustor. Similarly, if the aforementioned nozzle apertures with $D_1/D_2 > 2.0$ were provided with vortex generators, a flat flame would be produced when coupled with a precombustor having an asymmetric outlet cross section. There is sufficient spreading of flows from the nozzle apertures with $D_1/D_2 > 2.0$ to produce flat flames when coupled with precombustors having asymmetric outlet cross section. The flat flames produced by nozzle apertures with $D_1/D_2 > 2.0$ generally have a lower aspect ratio than the flat flames produced from nozzle apertures with $D_1/D_2 > 2.0$ and vortex generators.

Figure 14:
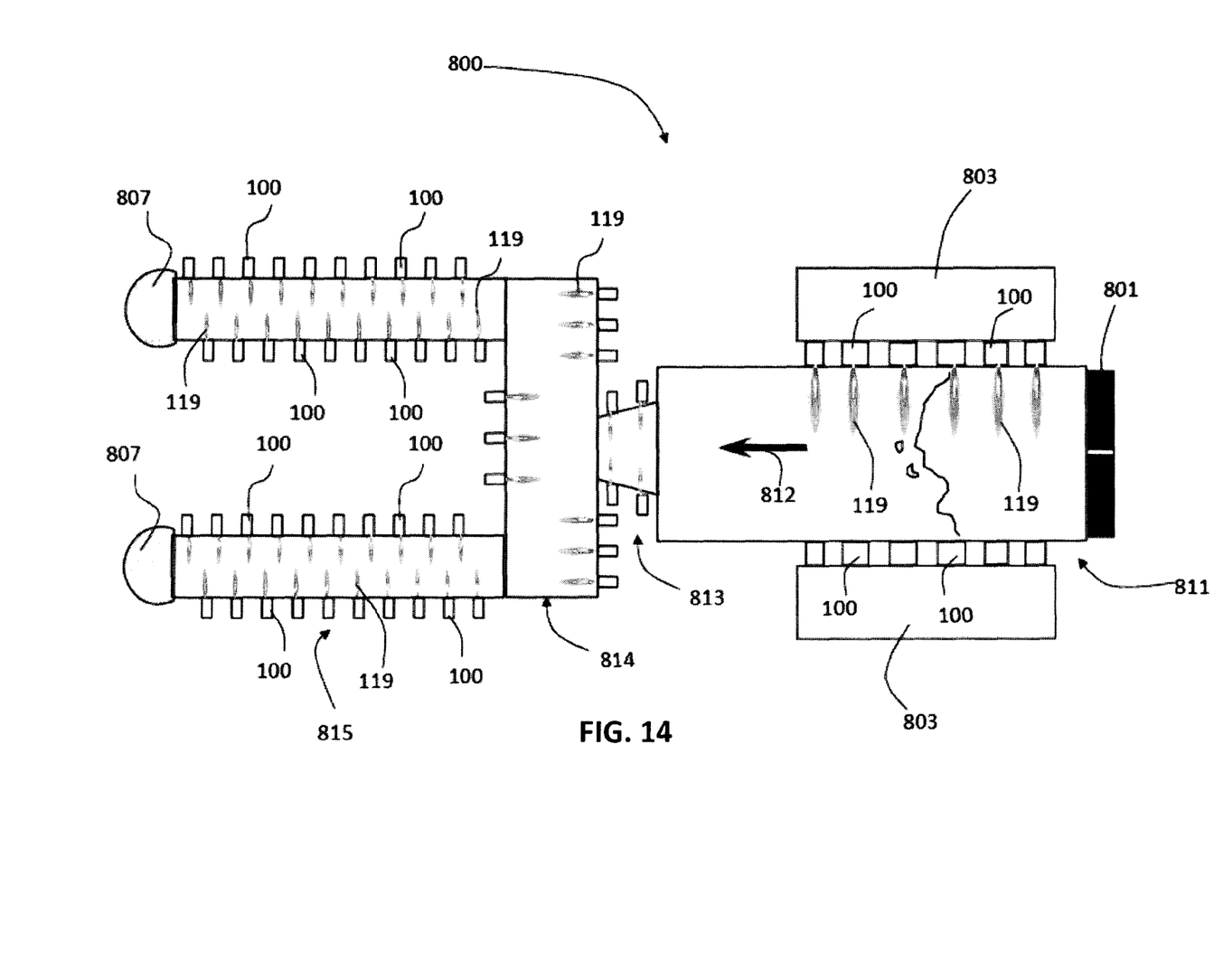
FIG. 14 is a schematic drawing of a glass-melting furnace utilizing oxy-fuel burner arrangements according to the present disclosure.

Referring now to FIG. 14, FIG. 14 shows a glass-melting furnace 800 utilizing oxy-fuel burner arrangements 100 according to the present disclosure. While the oxy-fuel burner arrangements 100 are shown throughout the glass-melting furnace 800, any combination or any number of oxy-fuel burner arrangement 100 may be used, including combinations wherein the oxy-fuel burner arrangements 100 are utilized in only selected sections or locations of the glass-melting furnace. The glass-melting furnace 800 includes a series of batch chargers 801 that charge material to form a glass to a melter 811. Regenerators 803 feed air fuel burner arrangement 100 that form flames 119 which heat and melt the batch material, the molten material which flows through melter 811 in direction 812. From the melter 811, the glass flows to an optional refiner 813 where additional burner arrangements 100 provide heat to the molten glass to further refine the glass melt. From the refiner 813, the glass is provided to a canal 814, where the glass is cooled or heated, but generally cooled, to the proper average temperature required for the type of glass being made. The molten glass flows from the canal into the forehearth 815, where the temperature of the glass is held and equalized to equalize the glass viscosity prior to being transported to formers 807. The forehearth 815 includes oxy-fuel burner arrangements 100 to maintain a temperature while being transported to the glass forming equipment 807. The glass in the forehearth 815 is preferably maintained at a uniform temperature. The forming equipment 807 transforms the glass into the desired product, for example, a container or fiber.

EXAMPLES

Certain aspects of the invention are illustrated by the following Examples. These Examples do not limit the scope of the claims appended hereto.

Example 1

This Example evaluates the effect of fuel nozzle aperture geometry on the flame produced from the burner assembly in FIG. 1 with a cylindrical precombustor using fuel nozzle apertures shown in FIGS. 6-11. The burner was fired while equipped with each of the fuel nozzle apertures in a single burner test mode at a firing rate of 20,000 Btu/h in a refractory lined box. The burner tests of this example used a cylindrical precombustor length/diameter (L/D) of 6. The results of the evaluation are shown below in Table 1.

TABLE 1

| Fuel Nozzle Aperture | Aspect Ratio | Visible Flame Length Compared with Circle Nozzle | Fuel velocity/ Oxygen velocity |
|---|---|---|---|
| Circle | 1.0 | — | 3.9 |
| Square | 1.0 | Unchanged | 8.1 |
| Cross | 1.0 | Unchanged | 8.1 |
| Clover | 1.07 | Unchanged | 8.1 |
| Snowman | 1.8 | Unchanged | 8.1 |
| Slot | 3.0 | Shortened | 8.1 |
| Two Half Circles | 4.17 | Shortened | 6.4 |

The results of these single burner firing tests show that changing the fuel nozzle aperture geometry has no effect on the flames produced by this burner if the aperture has an aspect ratio of 1.8 or less. However, if the fuel nozzle aperture has an aspect ratio greater than 1.8, the length of the flame is shortened. This flame shortening effect was observed at two different fuel/oxygen velocity ratios for high aspect ratio nozzle apertures, indicating that change in flame length is controlled by the nozzle aperture geometry rather than the fuel velocity to oxygen velocity ratio.

Example 2

Example 2 is an evaluation of flame characteristics for a burner firing with a Circle (symmetric) and a burner firing with a Slot (non-circular) fuel nozzles aperture (shown in FIGS. 6-7), in single and multiple burner configurations in a refractory lined box. The cylindrical precombustor L/D for these tests was 6. Visible flame lengths are given in Table 2 (below). The visible flame lengths for both fuel nozzle aperture geometries shortened when the burners were fired in a multiple burner configuration as compared with a single burner configuration. The non-circular nozzle aperture geometry produced a shorter flame than the symmetric nozzle aperture geometry in both the single and the multiple burner firing configurations. Two different firing rates were tested in the multiple burner configuration. The non-circular nozzle aperture geometry produced a shorter flame than the symmetric nozzle aperture geometry at both firing rates. The precombustor geometry influences the length of the visible flame produced by this burner. The visible flame produced by the burner with the non-circular nozzle aperture with a flared precombustor is longer than the visible flame produced by the burner with the non-circular nozzle aperture with a cylindrical precombustor. In fact, the length of the visible flame produced by the non-circular nozzle/flared precombustor configuration is comparable to the visible flame length produced by the circle nozzle/cylindrical precombustor configuration.

TABLE 2

| Fuel Nozzle Type | Firing Rate (1,000 Btu/h) | Flame Length (single burner test mode) | Flame Length (multiple burner test mode) | Cylinder Precombustor Channel Type |
|---|---|---|---|---|
| Circle | 20 | v. long | medium | Straight |
| Circle | 15 | Medium | short | Straight |
| Slot | 20 | mod. Long | short | Straight |
| Slot | 15 | Medium | v. short | Straight |
| Slot | 20 | Long | medium | Flared |
| Slot | 15 | Medium | medium | Flared |
| Slot | 12 | — | v.v. short | Flared |

Example 3

Example 3 is an evaluation of the temperature of the precombustor wall at various distances from the precombustor outlet for burners firing symmetric and non-circular fuel nozzle apertures of FIGS. 6 and 7 (TC1 is closest to the precombustor outlet, TC2 is further from the precombustor outlet than TC1 and TC3 is the furthest from the precombustor outlet). The temperatures were recorded after firing four burners into a refractory lined box at 15,000 Btu/h per burner for 4.75 hr, to achieve thermal equilibrium. The floor temperature range is the difference between the maximum and minimum temperature recorded from four thermocouples placed at regular intervals throughout and a height of one inch above the floor of the refractory lined box. The floor temperatures represent the molten material temperature. The results of the evaluation are shown in Table 3 below.

TABLE 3

| Circle Fuel Nozzle (equilibrated 4.75 hours) | | Slot Fuel Nozzle (equilibrated 4.75 hours) | | Δ T Circle minus Slot (° C.) |
|---|---|---|---|---|
| Thermocouple | Temperature (° C.) | Thermocouple | Temperature (° C.) | |
| Block TC1 | 1010 | Block TC11 | 973 | 37 |
| Block TC2 | 1111 | Block TC2 | 1029 | 82 |
| Block TC3 | 904 | Block TC3 | 753 | 151 |
| Box Floor Temperture Range | 39 | Box Floor Temperature Range | 40 | −1 |
| Average Box Floor Temperature | 944 | Average Box Floor Temperature | 943 | −1 |

Table 3 shows that flames produced by both symmetric and non-circular nozzle aperture burners create the same temperature distribution along the floor of the box using this 4-burner firing configuration, as evidenced by the similar floor thermocouple ranges recorded for the two tests. The temperatures recorded along the wall of the precombustor for the two tests are not the same. Unexpectedly, the precombustor wall temperature for the non-circular nozzle flame is always lower than the precombustor wall temperature for the symmetric nozzle. Even more surprising is that the precombustor wall temperature difference between the two types of flames is the largest at points furthest from the precombustor outlet, where the affects of radiation from the chamber are the lowest. The non-circular nozzle burner is purported to produce shorter flames by enhancing mixing between the fuel and the oxidant. This enhanced mixing is expected to generate unsuitably high temperatures inside the precombustor. In practice, the precombustor wall temperature is actually lower for the nozzle that promotes mixing than the nozzle with lower levels of fuel and oxidant mixing. The reduced precombustor temperatures are a significant advantage for the non-circular nozzle burner, since lower temperatures lead to a longer service life for a cooler operating burner.

Example 4

Example 4 is an evaluation of the affect of cylindrical precombustor L/D, wherein L is the length of the cylindrical precombustor and D is the diameter of the cylindrical precombustor (shown in FIGS. 2 and 3) on the precombustor wall temperature in a single burner test configuration. The results of the evaluation are shown in Table 4 below. The affect of L/D on flame characteristics is a function of firing rate and nozzle aperture type. In general and without wishing to be bound by any theory or explanation, smaller L/D leads to lower momentum flames and higher flame luminosity. Low flame momentum for symmetric nozzle apertures leads to hot spots on the precombustor, since it is believed that the low momentum flame tends to orient itself toward the roof of the box at the precombustor outlet thereby leading to partial flame impingement. Symmetric nozzle apertures typically employ precombustor L/D greater than 3 and less than 7 to produce flames without overheating the precombustor. Non-circular nozzle apertures behave similarly to symmetric nozzle apertures, with L/D ranges from about 3 to less than 7 to inhibit, and in most cases, prevent precombustor overheating. Non-circular nozzles with vortex generators require cylindrical precombustors with smaller L/D, since the flow spreading caused by the vortex generators can create hot spots on the precombustor at larger L/D. Nozzles with vortex generators typically employ a cylindrical precombustor L/D from about 1 to about 3. The symmetric nozzle aperture L/D values from about 3 to less than 7 are useful for non-circular nozzles with vortex generators when the precombustor outlet cross section is asymmetric. The asymmetric outlet cross section provides space for the flow spreading and reduces, if not eliminates, the flame impingement at the longer L/D. In order to maintain a favorable flame momentum, the asymmetric outlet cross sectional area is typically be on the order of 100 times the area of the asymmetric nozzle aperture.

TABLE 4

| Nozzle Aperture Type | Firing Rate (1,000 Btu/h) | L/D | Flame Momentum | Flame Luminosity | OverHeating Precombustor Wall |
|---|---|---|---|---|---|
| Circle | 20 | 7 | high | medium | Yes |
| Circle | 20 | 6 | high | high | No |
| Circle | 15 | 3.0 | low | high | Yes |
| Slot | 20 | 6 | high | high | No |
| Zipper | 20 | 6 | high | low | Yes |
| Zipper | 20 | 3 | medium | high | No |
| Zipper* | 20* | 6* | medium* | medium* | No* |
| Circle | 90 | 6 | high | medium | No |
| Zipper | 80 | 3 | medium | low | Yes |
| Zipper | 80 | 1 | medium | medium | No |

*Precombustor with asymmetric outlet cross section

Example 5

Example 5 is an evaluation of temperatures recorded at various locations inside a refractory lined box for burners firing different fuel nozzle aperture geometries with cylindrical precombustors at a range of firing rates, wall to wall distance and either single burner firing or two burner firing configurations. Wall to wall distance is the distance between the block face and the opposite wall of the box. Opposite floor temperature is the temperature measured 1 inch above the floor of the box at the wall opposite the burner. Opposite wall temperature is the temperature of the wall opposite the burner at the same height as the precombustor center line. The opposite wall temperature gives an indication of flame impingement. The opposite wall minus opposite floor temperature gives an indication of the homogeneity of the temperature distribution for the burner configuration.

TABLE 5

| Fuel Nozzle Aperture | Wall to Wall Distance (mm) | Natural Gas Flow per Burner (Nm³/h) | Opposite Floor Temperature (° C.) | Opposite Wall Temperature (° C.) | ΔT Opposite Wall minus Floor Temperature (° C.) |
|---|---|---|---|---|---|
| Circle | 559 | 2.5 | 1191 | 1438 | 247 |
| Slot | 559 | 2.5 | 1189 | 1397 | 208 |
| Slot | 600 | 1.7* | 1093 | 1223 | 130 |
| Slot | 600 | 2.5* | 1228 | 1299 | 71 |
| Circle | 600 | 3.7 | 1150 | 1226 | 76 |
| Slot | 600 | 3.7 | 1149 | 1168 | 19 |

*Two burner firing configuration

Table 5 shows opposite floor and opposite wall temperatures in the refractory lined box when the box is heated with a single burner or two burners as a function of fuel nozzle aperture geometry, and firing rate. One effect of the non-circular fuel nozzle aperture compared with the symmetric fuel nozzle aperture at medium firing rates is demonstrated by the fact that the non-circular nozzle tests always show lower opposite wall temperatures than the symmetric nozzle tests. The reduction in ΔT between symmetric and non-circular nozzles is more pronounced at higher firing rates, (58° C. at 3.7 Nm3/h Natural Gas). If the floor temperature corresponds to the molten material temperature, this indicates that the maximum firing rate for the burner with the non-circular fuel nozzle aperture is significantly higher than the maximum firing rate for the burner with the symmetric fuel nozzle aperture in applications where the maximum firing rate is dictated by the width of the chamber or distribution canal. The narrow channel width typically means that the maximum firing rate is reached when flame impingement raises the opposite wall refractory temperature to its maximum working value. Shorter flame lengths enable the current invention to achieve higher molten material temperatures or higher production rates of finished product than prior art burners.

An advantage of the non-circular fuel nozzle aperture compared with the symmetric fuel nozzle aperture at medium firing rates is the fact that the non-circular nozzle tests always show lower opposite wall minus opposite floor temperatures. The more homogeneous temperature distribution inside the box for the burner with the non-circular nozzle compared with the burner with the circle nozzle is expected to lead to a more homogeneous molten material temperature. Therefore, the burner of this invention provides improvement in product quality over the prior art burners.

Example 6

Example 6 is an evaluation of temperature in the refractory lined box when the box is heated with burners having different fuel nozzle aperture geometries with cylindrical precombustors at different firing rates and firing either single or two burners at a time.

TABLE 6

| Fuel Nozzle Aperture | Number of Burners Firing | Single Burner Firing rate (Btu/h) | Floor Temperature Range [TC9-12] ° C. |
|---|---|---|---|
| Circle | One | 90,000 | >138 |
| Slot | One | 90,000 | 120 |
| Circle | One | 130,000 | 384 |
| Slot | One | 130,000 | 81 |

TABLE 6-continued

| Fuel Nozzle Aperture | Number of Burners Firing | Single Burner Firing rate (Btu/h) | Floor Temperature Range [TC9-12] ° C. |
|---|---|---|---|
| Slot | Two | 60,000 | 42 |
| Slot | Two | 90,000 | 19 |

Table 6 shows floor temperature ranges (maximum temperature minus minimum temperature) of four floor thermocouples in the box as a function of the number of burners firing, firing rate and the fuel nozzle aperture. The floor temperature range is the difference between the maximum and minimum temperature recorded from four thermocouples placed at regular intervals throughout and a height of one inch above the floor of the refractory lined box. The floor temperatures represent the molten material temperature. Once again, the non-circular nozzle burner tests shows lower floor temperature range than the symmetric nozzle burner, with the effect more pronounced at higher firing rates. This is another example of the superior temperature homogeneity of the heating space produced by the non-circular fuel nozzle aperture burner compared with the symmetric fuel nozzle aperture burner at medium firing. The creation of a more homogeneous temperature distribution with the non-circular nozzle burner compared with the symmetric nozzle burner is expected to lead to a more homogeneous molten material temperature. Therefore, the burner of this invention provides significant finished product quality improvement over the prior art burners.

Example 7

Example 7 is an evaluation of flame characteristics for different fuel nozzle aperture geometries and number of burners.

Two nozzles with different size vortex generators were fabricated and tested to determine if the flow patterns generated from this nozzle aperture geometry would produce flat flames when fired at low velocity into a confined space like a precombustor. Special burner blocks were designed to create the precombustors for the flames generated by these nozzles to allow the flames to spread as well as provide a smooth transition from the cylinder shape of the burner to the non-cylindrical cross section of the precombustor opening at the hot face. Table 7 shows the results for the flames generated as a function of the fuel nozzle aperture type.

Both the slot nozzle and the slot nozzle fabricated with the small delta tabs (slot with small delta tabs) exhibited axis inversion. The long axis of the flame was in the opposite direction to the long axis of the nozzle aperture. The axis inversion was unexpected, since the high velocity cold flow results reported by Zaman for these aperture geometries did not undergo axis inversion. The delta slot nozzle configuration for this Example was arranged similar to the "tabs" disclosed in the "Axis Switching and Spreading of an Asymmetric Jet: The Role of Coherent Structure Dynamics" article by Zaman. The delta slot nozzle fabricated with the larger delta tabs (slot with large delta tabs) did not exhibit axis inversion All of the flames exhibited some degree of asymmetry consistent with higher flame coverage provided by a flat flame.

TABLE 7

| Nozzle Aperture | Aperture Long Axis Orientation | Precombustor Long Axis Orientation | Inverted Flame | Flame Aspect Ratio Width-Height for Elipitcal/ Width-Height For Rounded Slot* | Narrowest Gap in Tip** (inch) |
|---|---|---|---|---|---|
| Slot | Vertical | Horizontal | Yes | 2.0/2.4 | 0.07 |
| Slot with Small Delta Tabs | Vertical | Horizontal | Yes | 3.0/3.6 | 0.04 |
| Slot with Large Delta Tabs | Horizontal | Horizontal | No | 3.3/4.0 | 0.02 |
| Zipper | Horizontal | Horizontal | No | 3.3/4.0 | 0.04 |

*Width/Height is the width and height of the visible flame; For all apertures D1/D2 > 2
**Narrowest Gap is measured at the narrowest opening in the nozzle While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An oxy-fuel burner arrangement comprising:
a first conduit having a nozzle aperture with an aspect ratio, $D_1/D_2$, of greater than or equal to about 2, the first conduit being arranged and disposed to provide a first fluid stream, the first fluid stream being a combustible fuel;
at least one second conduit arranged and disposed to provide a second gas stream circumferentially around the first fluid stream, the second gas stream being oxygen; and
a precombustor arranged and disposed to receive the first fluid stream and second gas stream where an oxy-fuel flame is produced, the precombustor having a length to diameter ratio greater than or equal to about 2.0 and less than about 6.0;
wherein the geometry of the nozzle aperture and the cross-sectional geometry of the first conduit are dissimilar; and
wherein the precombustor has an inlet section having a constant diameter cylindrical geometry and an outlet section having an oval cross-sectional geometry oriented vertically.

2. An oxy-fuel burner arrangement comprising:
a first conduit having a nozzle aperture with an aspect ratio, $D_1/D_2$, of greater than or equal to about 2, the first conduit being arranged and disposed to provide a first fluid stream, the first fluid stream being a combustible fuel;
at least one second conduit arranged and disposed to provide a second gas stream circumferentially around the first fluid stream, the second gas stream being oxygen; and
a precombustor arranged and disposed to receive the first fluid stream and second gas stream where an oxy-fuel flame is produced, the precombustor having a length to diameter ratio greater than or equal to about 2.0 and less than about 6.0;

wherein the geometry of the nozzle aperture and the cross-sectional geometry of the first conduit are dissimilar; and wherein the precombustor has an inlet section having a constant diameter cylindrical geometry and an outlet section having an oval cross-sectional geometry oriented horizontally.

3. An oxy-fuel burner arrangement comprising:

a first conduit having a nozzle aperture with an aspect ratio, $D_1/D_2$, of greater than or equal to about 2, the first conduit being arranged and disposed to provide a first fluid stream, the first fluid stream being a combustible fuel;

at least one second conduit arranged and disposed to provide a second gas stream circumferentially around the first fluid stream, the second gas stream being oxygen; and a precombustor arranged and disposed to receive the first fluid stream and second gas stream where an oxy-fuel flame is produced, the precombustor having a length to diameter ratio greater than or equal to about 2.0 and less than about 6.0;

wherein the geometry of the nozzle aperture and the cross-sectional geometry of the first conduit are dissimilar; and wherein the precombustor has a cross-sectional geometry including an aspect ratio, $D_1'/D_2'$, of greater than 2.0.

4. A method for producing a flat oxy-fuel flame comprising:

providing an oxy-fuel burner arrangement comprising a first conduit, at least one second conduit, and a precombustor;

flowing a first fluid stream in the first conduit and through a nozzle aperture with an aspect ratio, $D_1/D_2$, of greater than or equal to about 2.0, the first fluid stream being a combustible fuel; and flowing a second gas stream circumferentially around the first fluid stream in the at least one second conduit, the second gas stream being oxygen;

forming an oxy-fuel flame in a precombustor with the first and second gas streams, the precombustor having a length to diameter ratio greater than or equal to about 2.0 and less than about 6.0;

wherein the geometry of the nozzle aperture and the cross-sectional geometry of the first conduit are dissimilar.

5. The method of claim 4 wherein the precombustor has an asymmetrical outlet cross-section and wherein a long axis of the precombustor outlet is aligned with the direction gas stream spreading.

6. The method of claim 4 wherein the flat oxy-fuel flame is used for heating glass.

* * * * *